(12) United States Patent
Marlor

(10) Patent No.: US 6,589,896 B1
(45) Date of Patent: Jul. 8, 2003

(54) LEAD- AND ARSENIC-FREE BOROSILICATE GLASS HAVING IMPROVED MELTING CHARACTERISTIC

(75) Inventor: Richard C. Marlor, Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/163,653

(22) Filed: Jun. 6, 2002

(51) Int. Cl.⁷ ............................................... C03C 3/091
(52) U.S. Cl. ............................................. 501/66; 501/67
(58) Field of Search ............................... 501/65, 66, 67

(56) References Cited

U.S. PATENT DOCUMENTS

| | | | | |
|---|---|---|---|---|
| 3,531,677 A | 9/1970 | Loughridge | ................. | 313/112 |
| 3,984,252 A | 10/1976 | Kiefer | .......................... | 106/54 |
| 4,806,268 A | 2/1989 | Kiss et al. | ............. | 252/331.4 F |
| 4,925,814 A | 5/1990 | Fine | ............................. | 501/66 |
| 5,077,240 A | * 12/1991 | Hayden et al. | ................ | 501/67 |
| 5,182,237 A | 1/1993 | Brix | ............................. | 501/66 |
| 5,459,110 A | 10/1995 | Brix | ............................. | 501/67 |
| 5,528,107 A | 6/1996 | Marlor et al. | ............... | 313/636 |
| 5,557,171 A | 9/1996 | Marlor et al. | ................ | 313/636 |
| 5,599,753 A | 2/1997 | Watzke et al. | ................. | 501/66 |
| 5,849,649 A | 12/1998 | Poole | ........................... | 501/26 |
| 5,885,915 A | 3/1999 | Bako et al. | ................... | 501/66 |
| 6,118,216 A | 9/2000 | Marlor | ........................ | 313/636 |
| 6,284,686 B1 | 9/2001 | Marlor | ........................ | 501/64 |

FOREIGN PATENT DOCUMENTS

| | | | | |
|---|---|---|---|---|
| EP | 0 603 933 A1 | 6/1994 | ........... | C03C/3/087 |
| JP | 6-56467 | 3/1994 | ........... | C03C/3/093 |
| JP | 8-12369 | 1/1996 | ........... | C03C/3/093 |

OTHER PUBLICATIONS

*Abstract*, RU2035414, Filimonova et al. (May 20, 1995).

* cited by examiner

*Primary Examiner*—Mark L. Bell
*Assistant Examiner*—Elizabeth A Bolden
(74) *Attorney, Agent, or Firm*—Robert F. Clark

(57) ABSTRACT

A lead- and arsenic-free borosilicate glass having an improved melting characteristic is described. The melting rate of the glass was improved dramatically by making the composition substantially free of MgO and CaO and adding 1.0 to 4.0 weight percent BaO. The improved melting characteristic yielded up to a ninety-nine percent reduction in the number of unmelted batch stones.

4 Claims, No Drawings

LEAD- AND ARSENIC-FREE BOROSILICATE GLASS HAVING IMPROVED MELTING CHARACTERISTIC

TECHNICAL FIELD

This invention is related to borosilicate glasses and in particular to lead- and arsenic-free borosilicate glasses. In another aspect, this invention is related to glass envelopes for electric lamps.

BACKGROUND OF THE INVENTION

In recent years, the glass industry has been moving toward the elimination of lead and arsenic from borosilicate glass compositions. For example, commonly-owned U.S. Pat. No. 6,284,686, which is incorporated herein by reference, describes a useful lead- and arsenic-free borosilicate glass composition for use in electric lamps (OSRAM SYLVANIA Type SG773). Other lead- and arsenic-free borosilicate glasses used to manufacture electric lamps include types 8486 and 8487 manufactured by Schott Glas.

While the elimination of lead and arsenic is beneficial to the environment, their elimination can result in an increase in the number of glass defects, particularly knots, stones, and cord. It is believed that the majority of the defects which occur in lead- and arsenic-free borosilicate glasses are caused by incomplete melting and a reduced convective mixing of the batch components, e.g., knots and stones are the remnants of incomplete melting and surface scum. Therefore, it would be desirable to improve the melting characteristics of lead- and arsenic-free borosilicate glasses to reduce the number of glass defects.

SUMMARY OF THE INVENTION

It is an object of the invention to obviate the disadvantages of the prior art.

It is another object of the invention to reduce the number of glass defects which occur when melting lead- and arsenic-free borosilicate glasses.

It is yet another object of the invention to improve the melting characteristics of lead- and arsenic-free borosilicate glasses.

These and other objects and advantages of the invention are achieved by substantially eliminating MgO and CaO from the borosilicate glass formulation and adding from 1.0 to 4.0 weight percent of BaO. In particular, there is provided a lead- and arsenic-free borosilicate glass having a composition which comprises in weight percent:

| | |
|---|---|
| $B_2O_3$ | 13.5–16.8 |
| $Na_2O$ | 2.0–5.0 |
| $K_2O$ | 1.3–4.0 |
| $Li_2O$ | 0–0.30 |
| $Al_2O_3$ | 2.0–4.0 |
| $Fe_2O_3$ | 0.02–0.17 |
| $CeO_2$ | 0–0.12 |
| TiO | 0.01–0.30 |
| BaO | 1.0–4.0 |
| $SiO_2$ | balance | wherein the sum of $Na_2O$, $K_2O$ and $Li_2O$ is from 4.7 to 6.5 weight percent and the composition is substantially free of MgO and CaO.

Preferably, the borosilicate glass of this invention has a BaO content from 2.0 weight percent to 4.0 weight percent, and more preferably, 2.0 weight percent.

In a narrower aspect, the lead- and arsenic-free borosilicate glass of this invention has a composition which comprises in weight percent:

| | |
|---|---|
| $B_2O_3$ | 14.4 |
| $Na_2O$ | 2.9 |
| $K_2O$ | 2.6 |
| $Li_2O$ | 0.20 |
| $Al_2O_3$ | 3.0 |
| BaO | 2.0 |
| $Fe_2O_3$ | 0.060 |
| $CeO_2$ | 0.075 |
| TiO | 0.10 |
| $SiO_2$ | balance | wherein the sum of $Na_2O$, $K_2O$ and $Li_2O$ is from 4.7 to 6.5 weight percent and the composition is substantially free of MgO and CaO.

DETAILED DESCRIPTION OF THE INVENTION

For a better understanding of the present invention, together with other and further objects, advantages and capabilities thereof, reference is made to the following disclosure and appended claims.

Glass defects resulting from incomplete melting and reduced convective mixing tends to be more of a problem for gas-fired melters as compared to electric glass furnaces. Gas-fired melters produce glass melts with molten surface layers and rely on convective currents in the melt for mixing the molten surface with the bulk. Electric glass furnaces are usually cold crowned so that gravity acts to pull the cooler, denser glass at the surface into the melt. The cooler surface also reduces volatilization and surface scum formation. Therefore, although the glass of this invention may be melted in most conventional glass melters, including electric furnaces, the improved melting characteristic it provides is particularly advantageous for gas-fired melters as described herein.

During the melting process in a gas-fired melter, fining gases can float refractory grains (primarily sand grains) to the surface of the melt, resulting in density gradients. An accumulation of sand grains at the melt surface will be difficult to mix with the underlying, higher density glass. A silica-rich surface scum can result. To prevent scum formation, convective forces are needed to move sand grains back into the melt to complete the melting process. With gas-fired melters, it is common practice to install a single or dual bubbler row in the melter to assist convective mixing. This method is only partially effective in preventing silica scum.

Lowering melt surface tension of the borosilicate glass was investigated as a means to improve convective mixing. Melting experiments have shown that with lead-and arsenic-containing borosilicate glasses, convective mixing is quite vigorous. Both PbO and $As_2O_3$ lower melt surface tension. BaO is also known to lower the surface tension of glass.

However, other alkaline earths, such as MgO, CaO, and SrO are all known to increase surface tension. (See, e.g., W. A. Weyl and E. C. Marboe, *The Constitution of Glasses: A Dynamic Interpretation*, Vol II, (1964), pp 639–644; and M. B. Volf, *Chemical Approach to Glass*, Elsevier, (1984)). It was discovered that the melting and fining characteristics of the Type SG773 lead- and arsenic-free borosilicate glass described in U.S. Pat. No. 6,284,686 could be dramatically improved when MgO and CaO were removed from the glass composition and from 1.0–4.0 weight percent (wt. %) BaO added. In particular, ninety-nine percent fewer stones (unmelted raw material particles) have been observed compared to a typical SG773 glass. This dramatic improvement is believed to be the result of better convective mixing in the melt caused by lowering the melt's surface tension.

It is common practice for manufacturers of prior art borosilicate glass compositions to use dolomite, $CaMg(CO_3)_2$, as an inexpensive source of MgO and CaO. Dolomite is not used in the borosilicate composition of this invention since MgO and CaO are not contained in the glass composition. However, although CaO are MgO are not purposefully added to the borosilicate glass of this invention, small amounts of CaO and MgO cannot be completely excluded since Mg and Ca impurities may be present in some of the naturally occurring batch materials. Therefore, as used herein, substantially free of MgO and CaO means that the aggregate amounts of MgO and CaO in the glass composition do not exceed about 0.15 weight percent (wt. %).

Both anhydrous borax (ABX) and 5-mol borax (BX), $Na_2O \cdot B_2O_3 \cdot 5H_2O$, have been used as sources of $B_2O_3$ and $Na_2O$ in borosilicate glass compositions. Laboratory experiments have shown that silica grains are floated the most when 5-mol borax is used as the borax containing raw material. In particular, the greatest improvement in the melting rate observed thus far was for a batch containing 4 wt. % BaO (no dolomite) melted with a 5-mol borax.

The following non-limiting examples are presented.

EXAMPLES

The glass batch compositions listed in Tables 1, 2 and 3 were melted and compared for glass melting quality. Batches were made with 100% 5-mol borax (BX) (Tables 1 and 3), as well as with a mixture of 5-mol and anhydrous borax (ABX): 60% BX/40% ABX (Table 2). Well-mixed batches were melted in platinum crucibles in a laboratory furnace at 1550° C. Melts were removed at 2 and 3 hours, poured into long strips (approx. 20 cm×4 cm×1 cm), annealed, and examined for unmelted stones. A polarizing microscope with a full-wave tint plate was used to count the unmelted batch stones.

TABLE 1

SG773 BaO Batches Without Dolomite

| Oxide** | Std. SG773 0 wt. % BaO Dolomite | 1 wt. % BaO No Dolomite | 2 wt. % BaO No Dolomite | 4 wt. % BaO No Dolomite |
|---|---|---|---|---|
| $SiO_2$ | 73.8 | 73.7 | 73.0 | 71.5 |
| $B_2O_3$ | 15.8 | 15.4 | 15.3 | 15.0 |
| $Na_2O$ | 3.0 | 3.2 | 3.2 | 3.1 |
| $K_2O$ | 3.0 | 3.1 | 3.1 | 3.0 |
| $Li_2O$ | 0.2 | 0.2 | 0.2 | 0.2 |
| CaO | 0.6 | 0.1* | 0.1* | 0.1* |
| MgO | 0.4 | — | — | — |
| BaO | — | 1.0 | 2.0 | 4.0 |
| $Al_2O_3$ | 3.0 | 3.1 | 3.0 | 2.9 |
| $Fe_2O_3$ | 0.05 | 0.05 | 0.05 | 0.05 |
| $TiO_2$ | 0.1 | 0.1 | 0.1 | 0.1 |
| $CeO_2$ | 0.08 | 0.08 | 0.08 | 0.08 |
| Total | 100 | 100 | 100 | 100 |
| Stones/pound of glass | | | | |
| 1550° C. - 2 hours | 1842 | 237 | 84 | 9 |
| 1550° C. - 3 hours | 420 | 15 | 23 | 4 |

*impurity
**5-mol borax (BX) containing batches

To maximize floating of sand grains in the laboratory, batches were prepared with 5-mol borax as the raw material source of borax. Table 1 shows that melting rate of standard SG773 glass (0-wt. % BaO, dolomite) was improved by 87% at 2 hours by substituting BaO for the 1 wt. % CaO and MgO in the batch. With increasing additions of BaO to the CaO- and MgO-free batches, the melting rate was further improved. In particular, the melting rate for the preferred 2-wt. % BaO batch is shown to improve by 65% when compared to the 1-wt. % BaO containing batch.

Although further additions of BaO to the SG773 composition will also increase the melting rate, BaO is a relatively expensive component. Above 4-wt. % BaO, the cost of the batch becomes prohibitively high when compared to the incremental increase in the melting rate.

TABLE 2

Effect of Removing CaO and MgO from the Batch

| Oxide* | Std. SG773 0 wt. % BaO Dolomite | 2 wt. % BaO Dolomite | 2 wt. % BaO No Dolomite |
|---|---|---|---|
| $SiO_2$ | 73.8 | 73.2 | 73.0 |
| $B_2O_3$ | 15.8 | 15.0 | 15.3 |
| $Na_2O$ | 3.0 | 3.8 | 3.2 |
| $K_2O$ | 3.0 | 1.9 | 3.1 |
| $Li_2O$ | 0.2 | 0.2 | 0.2 |
| CaO | 0.6 | 0.7 | 0.1* |
| MgO | 0.4 | 0.3 | |
| BaO | — | 2.0 | 2.0 |
| $Al_2O_3$ | 3.0 | 2.9 | 3.0 |
| $Fe_2O_3$ | 0.05 | 0.0 | 0.05 |
| $TiO_2$ | 0.1 | 0.0 | 0.1 |
| $CeO_2$ | 0.08 | 0.0 | 0.08 |
| Total | 100 | 100 | 100 |
| Stones/pound of glass | | | |
| 1550° C. - 2 hours | 1043 | 418 | 28 |
| 1550° C. - 3 hours | 167 | 28 | 0 |

*impurity
**Borax source, 60% 5-mol borax (BX), 40% anhydrous borax (ABX)

Table 2 shows the effect of removing dolomite from the preferred 2-wt. % BaO batch. A production ratio of 5-mol and anhydrous borax (60% BX/40% ABX) was used for this example. After 2 hours of heating, the dolomite-free batch has the same number of unmelted stones as does the dolomite-containing batch after 3 hours of heating. This one-hour improvement in melting time is a tremendous advantage in melting efficiency. Within 3 hours or less, the dolomite-free batch was completely melted.

As can be seen in Table 2, the preferred SG773 2-wt. % BaO composition without dolomite had ninety-seven percent fewer unmelted batch stones after 2 hours than the standard SG773 composition. This major decrease in the number of batch stones represents a tremendous improvement in the melting rate of the standard SG773 batch. When dolomite is kept in the BaO containing batch, the melting rate is also improved, but by only 60%. The effect of the dolomite removal from the batch is also evident in Table 3 for the BaO-containing batches made with 100% 5-mol borax.

TABLE 3

Effect of Removing CaO and MgO from the Batch

| Oxide** | 2 wt. % BaO Dolomite | 2 wt. % BaO No Dolomite | 4 wt. % BaO Dolomite | 4 wt. % BaO No Dolomite |
|---|---|---|---|---|
| $SiO_2$ | 73.0 | 73.0 | 71.5 | 71.5 |
| $B_2O_3$ | 15.0 | 15.3 | 14.7 | 15.0 |
| $Na_2O$ | 2.8 | 3.2 | 2.8 | 3.1 |
| $K_2O$ | 2.8 | 3.1 | 2.7 | 3.0 |
| $Li_2O$ | 0.2 | 0.2 | 0.2 | 0.2 |
| CaO | 0.6 | 0.1* | 0.6 | 0.1* |
| MgO | 0.3 | — | 0.3 | — |
| BaO | 2.0 | 2.0 | 4.0 | 4.0 |
| $Al_2O_3$ | 3.0 | 3.0 | 2.9 | 2.9 |
| $Fe_2O_3$ | 0.05 | 0.05 | 0.05 | 0.05 |
| $TiO_2$ | 0.1 | 0.1 | 0.1 | 0.1 |
| $CeO_2$ | 0.08 | 0.08 | 0.08 | 0.08 |
| Total | 100 | 100 | 100 | 100 |
| Stones/pound of glass | | | | |
| 1550° C. - 2 hours | 787 | 84 | 432 | 9 |
| 1550° C. - 3 hours | 165 | 23 | 22 | 4 |

*impurity
**5-mol borax used in all batches

While there has been shown and described what are at the present considered the preferred embodiments of the invention, it will be obvious to those skilled in the art that various changes and modifications may be made therein without departing from the scope of the invention as defined by the appended claims.

I claim:

1. A lead- and arsenic-free borosilicate glass having a composition which consists of in weight percent:

| | |
|---|---|
| $B_2O_3$ | 13.5–16.8 |
| $Na_2O$ | 2.0–5.0 |
| $K_2O$ | 1.3–4.0 |
| $Li_2O$ | 0–0.30 |
| $Al_2O_3$ | 2.0–4.0 |
| $Fe_2O_3$ | 0.02–0.17 |
| $CeO_2$ | 0–0.12 |
| TiO | 0.01–0.30 |
| BaO | 1.0–4.0 |
| $SiO_2$ | balance | wherein the sum of $Na_2O$, $K_2O$ and $Li_2O$ is from 4.7 to 6.5 weight percent and the composition is substantially free of MgO and CaO.

2. The borosilicate glass of claim 1 wherein the BaO content ranges from 2.0 weight percent to 4.0 weight percent.

3. The borosilicate glass of claim 1 wherein the BaO content is 2.0 weight percent.

4. A lead- and arsenic-free borosilicate glass having a composition which consists essentially of in weight percent:

| | |
|---|---|
| $B_2O_3$ | 14.4 |
| $Na_2O$ | 2.9 |
| $K_2O$ | 2.6 |
| $Li_2O$ | 0.20 |
| $Al_2O_3$ | 3.0 |
| $Fe_2O_3$ | 0.060 |
| $CeO_2$ | 0.075 |
| TiO | 0.10 |
| BaO | 2.0 |
| $SiO_2$ | balance | wherein the composition is substantially free of MgO and CaO.

* * * * *